(12) United States Patent
Hudson et al.

(10) Patent No.: US 11,105,240 B2
(45) Date of Patent: Aug. 31, 2021

(54) SYSTEMS AND METHODS FOR CONTROLLING A SHUT-OFF VALVE OF A DOSING CONTROL SYSTEM

(71) Applicant: CUMMINS EMISSION SOLUTIONS INC., Columbus, IN (US)

(72) Inventors: Joseph Andrew Hudson, Columbus, IN (US); Thomas R. Nelson, Greenwood, IN (US); Paul M. Hauser, Columbus, IN (US); Sandeep Sarabudla, Columbus, IN (US); Brian James Witsaman, Indianapolis, IN (US); Atul S. Abhyankar, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 16/524,858

(22) Filed: Jul. 29, 2019

(65) Prior Publication Data

US 2020/0040790 A1 Feb. 6, 2020

Related U.S. Application Data

(60) Provisional application No. 62/713,100, filed on Aug. 1, 2018.

(51) Int. Cl.
*F01N 3/20* (2006.01)
*G05D 7/06* (2006.01)
(Continued)

(52) U.S. Cl.
CPC ........ *F01N 3/2066* (2013.01); *F01N 3/0821* (2013.01); *F01N 11/002* (2013.01);
(Continued)

(58) Field of Classification Search
CPC ........ F01N 2610/02; F01N 2610/1493; F01N 3/208; F01N 3/2066; F01N 3/0821;
(Continued)

(56) References Cited

U.S. PATENT DOCUMENTS

8,635,854 B2 * 1/2014 Shovels ............... F01N 3/0253
60/287
9,670,818 B2 * 6/2017 Mutti, Jr. ............... F01N 3/206
(Continued)

*Primary Examiner* — Gonzalo Laguarda
(74) *Attorney, Agent, or Firm* — Foley & Lardner LLP (57) ABSTRACT

A dosing control system includes a shut-off valve, a reductant pump, a reductant injector, and a recirculation conduit. The shut-off valve is configured to receive reductant from a reductant tank. The reductant pump is configured to selectively receive the reductant from the shut-off valve. The reductant pump is configured to selectively be in a reductant pump command state. The reductant injector is configured to selectively receive the reductant from the reductant pump. The recirculation conduit is coupled to the reductant injector and the reductant tank. The recirculation conduit is configured to selectively provide the reductant from the reductant injector to the reductant tank. The shut-off valve is configured to prevent a flow of the reductant to the reductant pump when the reductant pump is not in the reductant pump command state.

18 Claims, 3 Drawing Sheets

(51) Int. Cl.
*F01N 11/00* (2006.01)
*F01N 3/08* (2006.01)

(52) U.S. Cl.
CPC .......... *G05D 7/0635* (2013.01); *F01N 3/0842* (2013.01); *F01N 3/208* (2013.01); *F01N 2610/02* (2013.01); *F01N 2610/11* (2013.01); *F01N 2610/144* (2013.01); *F01N 2610/1453* (2013.01)

(58) Field of Classification Search
CPC ................ F01N 3/0842; F01N 11/002; F01N 2610/144; Y02T 10/12; G05D 7/0635
See application file for complete search history.

(56) References Cited

U.S. PATENT DOCUMENTS

| | | | | |
|---|---|---|---|---|
| 2010/0229532 | A1* | 9/2010 | Ohno | ...................... F02D 29/02 60/274 |
| 2012/0020857 | A1* | 1/2012 | Isada | ........................ F01N 9/00 423/212 |

* cited by examiner

SYSTEMS AND METHODS FOR CONTROLLING A SHUT-OFF VALVE OF A DOSING CONTROL SYSTEM

CROSS-REFERENCE TO RELATED PATENT APPLICATION

This application claims the benefit of U.S. Provisional Patent Application No. 62/713,100, filed Aug. 1, 2018, the entire disclosure of which is incorporated herein by reference.

TECHNICAL FIELD

The present application relates generally to systems and methods for controlling a shut-off valve of a dosing control system in an aftertreatment system of an internal combustion engine.

BACKGROUND

For internal combustion engines, such as diesel engines, nitrogen oxide ($NO_x$) compounds may be emitted in the engine exhaust. To reduce $NO_x$ emissions, a reductant may be dosed into the exhaust by a dosing system. The dosing system includes an injector through which the reductant is dosed into the exhaust.

SUMMARY

In the above-described systems, a shut-off valve may be included to selectively prevent flow of the reductant to the injector. This shut-off valve may prevent flow of the reductant to the injector when the internal combustion engine is turned off. However, this shut-off valve cannot be controlled to provide reductant to the injector for the purposes of cooling the injector, via recirculation of the reductant therethrough, after the internal combustion engine has been turned off. As a result, the injector may be unable to dissipate heat effectively and may become undesirable. Additionally, this control valve cannot be controlled to prevent flow to the reductant pump when the reductant pump is not being commanded to provide reductant or during an emergency shut down. Accordingly, it is desirable to control a dosing system such that an injector is provided reductant after the internal combustion engine has been shut down, that is able to prevent flow of the reductant to the reductant pump when the reductant pump is not being commanded to provide flow, and to prevent flow to the reductant pump when in an emergency shut down.

In one embodiment, a dosing control system includes a shut-off valve, a reductant pump, a reductant injector, and a recirculation conduit. The shut-off valve is configured to receive reductant from a reductant tank. The reductant pump is configured to selectively receive the reductant from the shut-off valve. The reductant pump is configured to selectively be in a reductant pump command state. The reductant injector is configured to selectively receive the reductant from the reductant pump. The recirculation conduit is coupled to the reductant injector and the reductant tank. The recirculation conduit is configured to selectively provide the reductant from the reductant injector to the reductant tank. The shut-off valve is configured to prevent a flow of the reductant to the reductant pump when the reductant pump is not in the reductant pump command state.

In another embodiment, a method for controlling a shut-off valve of a dosing control system including a dosing control system controller and a reductant pump, includes determining, by the dosing control system controller, if the dosing control system is in an emergency shut down state. The method also includes determining, by the dosing control system controller, if the reductant pump is in a reductant command state. The method also includes opening, by the dosing control system controller, the shut-off valve in response to determining that the dosing control system is not in the emergency shut down state and that the reductant pump is in the reductant command state.

In yet another embodiment, a dosing control system controller includes a processing circuit. The processing circuit is selectively operable in an emergency shut down state and a reductant command state. The processing circuit is configured to shut down a reductant pump in the emergency shut down state, power the reductant pump in the reductant command state, and open a shut-off valve in the reductant command state and not in the emergency shut down state.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for controlling a shut-off valve of a dosing control system in an aftertreatment system of an internal combustion engine. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gases that are often treated by a dosing control system within an aftertreatment system. Dosing control systems inject reductant into exhaust gases within an exhaust conduit using an injector.

Dosing control systems may include valves that prevent the flow of reductant to the injector. However, these dosing control systems are unable to provide reductant to the injector for the purpose of cooling the injector such that the reductant is subsequently recirculated. As a result, the injector may not be adequately cooled during a hot shut down, potentially leading to the injector becoming undesirable. Furthermore, these dosing control systems are unable of being controlled to both prevent flow into a reductant pump during an emergency shut down and when the reductant pump is not being commanded to provide reductant. As a result, the reductant pump may be loaded with reductant when the reductant pump is not operational, thereby requiring a relatively large force to utilize initially (e.g., to empty the reductant that had been stored in the reductant pump prior to the reductant pump being commanded to provide flow, etc.). This large force may cause the reductant pump to operate inefficiently and/or to become undesirable.

Implementations described herein relate to dosing control systems that are configured to prevent flow of reductant to a reductant pump during an emergency shut down or when the reductant pump is not being commanded to provide flow but otherwise being capable of providing reductant to a reductant injector and facilitating the recirculation of that reductant from the reductant injector back to a reductant tank, thereby providing cooling to the reductant injector. In this way, reductant is not provided to the reductant pump when the reductant pump is not operational (e.g., during emergency shut down, when the reductant pump is not being commanded to provide flow, etc.) and the injector is protected from high temperatures through the use of recirculated reductant.

II. Overview of Aftertreatment System

Figure 1:
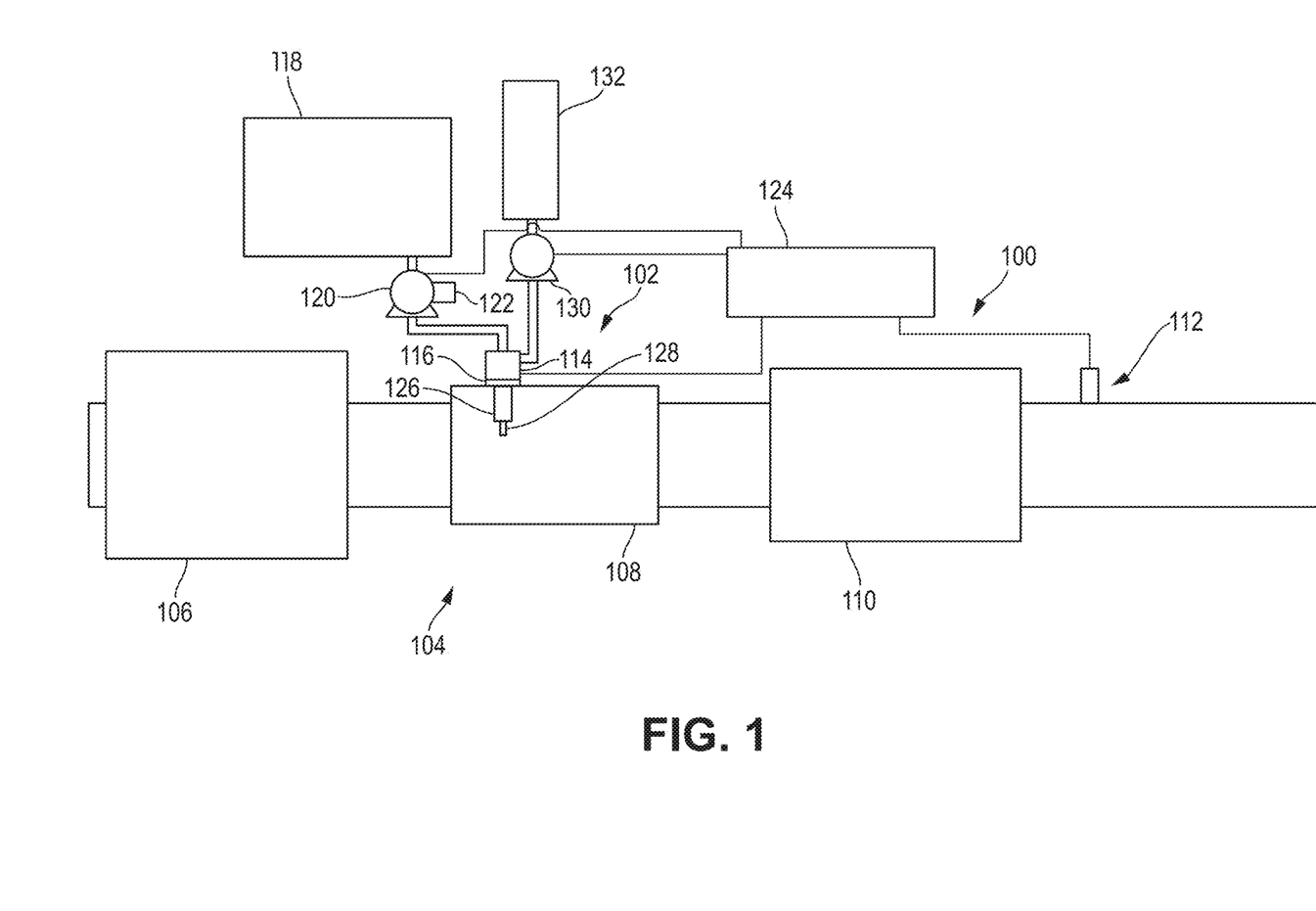
FIG. 1 is a block schematic diagram of an example aftertreatment system for an internal combustion engine.

FIG. 1 depicts an aftertreatment system 100 having an example reductant delivery system 102 for an exhaust system 104. The aftertreatment system 100 also includes a particulate filter (e.g., a diesel particulate filter (DPF) 106, a decomposition chamber 108 (e.g., reactor, reactor pipe, etc.), a SCR catalyst 110, and a sensor 112.

The DPF 106 is configured to (e.g., structured to, able to, etc.) remove particulate matter, such as soot, from exhaust gas flowing in the exhaust system 104. The DPF 106 includes an inlet, where the exhaust gas is received, and an outlet, where the exhaust gas exits after having particulate matter substantially filtered from the exhaust gas and/or converting the particulate matter into carbon dioxide. In some implementations, the DPF 106 may be omitted.

The decomposition chamber 108 is configured to convert a reductant into ammonia. The reductant may be, for example, urea, diesel exhaust fluid (DEF), Adblue®, an urea water solution (UWS), an aqueous urea solution (e.g., AUS32, etc.), and other similar fluids. The decomposition chamber 108 includes a reductant delivery system 102 having a doser or dosing module 114 configured to dose the reductant into the decomposition chamber 108 (e.g., via an injector). In some implementations, the reductant is injected upstream of the SCR catalyst 110. The reductant droplets then undergo the processes of evaporation, thermolysis, and hydrolysis to form gaseous ammonia within the exhaust system 104. The decomposition chamber 108 includes an inlet in fluid communication with the DPF 106 to receive the exhaust gas containing $NO_x$ emissions and an outlet for the exhaust gas, $NO_x$ emissions, ammonia, and/or reductant to flow to the SCR catalyst 110.

The decomposition chamber 108 includes the dosing module 114 mounted to the decomposition chamber 108 such that the dosing module 114 may dose the reductant into the exhaust gases flowing in the exhaust system 104. The dosing module 114 may include an insulator 116 interposed between a portion of the dosing module 114 and the portion of the decomposition chamber 108 on which the dosing module 114 is mounted. The dosing module 114 is fluidly coupled to (e.g., fluidly configured to communicate with, etc.) a reductant source 118. The reductant source 118 may include multiple reductant sources 118. The reductant source 118 may be, for example, a diesel exhaust fluid tank containing Adblue®.

A supply unit or reductant pump 120 is used to pressurize the reductant from the reductant source 118 for delivery to the dosing module 114. In some embodiments, the reductant pump 120 is pressure controlled (e.g., controlled to obtain a target pressure, etc.). The reductant pump 120 includes a filter 122. The filter 122 filters (e.g., strains, etc.) the reductant prior to the reductant being provided to internal components (e.g., pistons, vanes, etc.) of the reductant pump 120. For example, the filter 122 may inhibit or prevent the transmission of solids (e.g., solidified reductant, contaminants, etc.) to the internal components of the reductant pump 120. In this way, the filter 122 may facilitate prolonged desirable operation of the reductant pump 120. In some embodiments, the reductant pump 120 is coupled to a chassis of a vehicle (e.g., maritime vehicle, boat, shipping boat, barge, container ship, terrestrial vehicle, construction vehicle, truck, etc.) associated with the aftertreatment system 100.

The dosing module 114 and reductant pump 120 are also electrically or communicatively coupled to a controller 124. The controller 124 is configured to control the dosing module 114 to dose the reductant into the decomposition chamber 108. The controller 124 may also be configured to control the reductant pump 120. The controller 124 may include a microprocessor, an application-specific integrated circuit (ASIC), a field-programmable gate array (FPGA), etc., or combinations thereof. The controller 124 may include memory, which may include, but is not limited to, electronic, optical, magnetic, or any other storage or transmission device capable of providing a processor, ASIC, FPGA, etc. with program instructions. This memory may include a memory chip, Electrically Erasable Programmable Read-Only Memory (EEPROM), Erasable Programmable Read Only Memory (EPROM), flash memory, or any other suitable memory from which the associated controller can read instructions. The instructions may include code from any suitable programming language.

The SCR catalyst 110 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 110 includes an inlet in fluid communication with the decomposition chamber 108 from which exhaust gas and reductant are received and an outlet in fluid communication with an end of the exhaust system 104.

The exhaust system 104 may further include an oxidation catalyst (e.g., a diesel oxidation catalyst (DOC)) in fluid communication with the exhaust system 104 (e.g., downstream of the SCR catalyst 110 or upstream of the DPF 106) to oxidize hydrocarbons and carbon monoxide in the exhaust gas.

In some implementations, the DPF 106 may be positioned downstream of the decomposition chamber 108. For instance, the DPF 106 and the SCR catalyst 110 may be combined into a single unit. In some implementations, the dosing module 114 may instead be positioned downstream of a turbocharger or upstream of a turbocharger.

The sensor 112 may be coupled to the exhaust system 104 to detect a condition of the exhaust gas flowing through the exhaust system 104. In some implementations, the sensor 112 may have a portion disposed within the exhaust system 104; for example, a tip of the sensor 112 may extend into a portion of the exhaust system 104. In other implementations, the sensor 112 may receive exhaust gas through another conduit, such as one or more sample pipes extending from the exhaust system 104. While the sensor 112 is depicted as positioned downstream of the SCR catalyst 110, it should be understood that the sensor 112 may be positioned at any other position of the exhaust system 104, including upstream of the DPF 106, within the DPF 106, between the DPF 106 and the decomposition chamber 108, within the decomposition chamber 108, between the decomposition chamber 108 and the SCR catalyst 110, within the SCR catalyst 110, or downstream of the SCR catalyst 110. In addition, two or more sensors 112 may be utilized for detecting a condition of the exhaust gas, such as two, three, four, five, or six sensors 112 with each sensor 112 located at one of the aforementioned positions of the exhaust system 104.

The dosing module 114 includes a dosing lance assembly 126. The dosing lance assembly 126 includes a delivery conduit (e.g., delivery pipe, delivery hose, etc.). The delivery conduit is fluidly coupled to the reductant pump 120. The dosing lance assembly 126 includes at least one injector 128. The injector 128 is configured to dose the reductant into the exhaust gases (e.g., within the decomposition chamber 108, etc.). While not shown, it is understood that the dosing module 114 may include a plurality of injectors 128.

The reductant delivery system 102 may also include an air pump 130. The air pump 130 may draw air from an air source 132 (e.g., air intake, etc.). Additionally, the air pump 130 may provide the air to the dosing module 114 via a conduit. The dosing module 114 may be configured to mix the air and the reductant into an air-reductant mixture. The dosing module 114 may be further configured to provide the air-reductant mixture into the decomposition chamber 108.

III. Example Doser Control System

Figure 2:
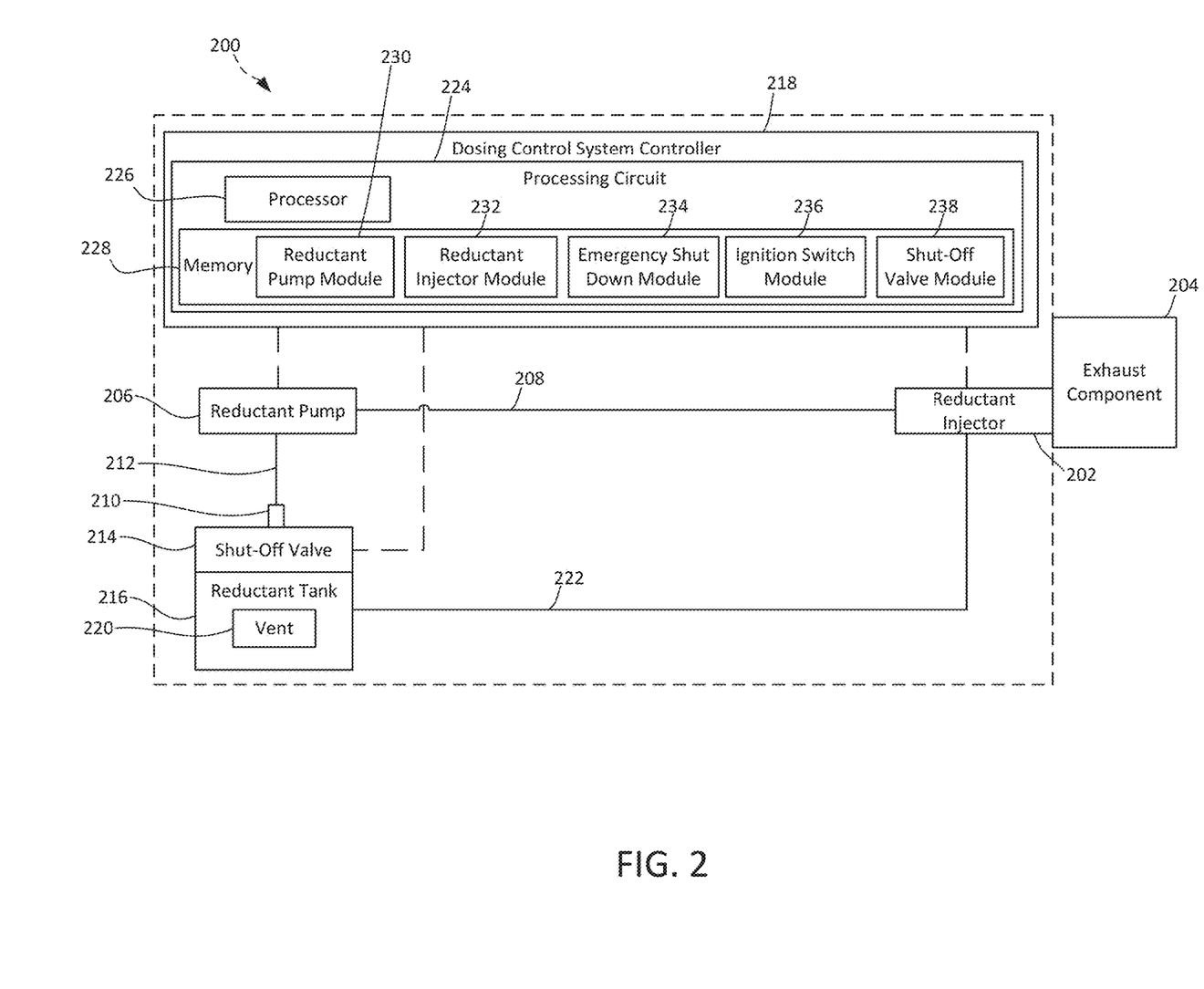
FIG. 2 is a block schematic diagram of an example dosing control system for use in an aftertreatment system, such as the example aftertreatment system shown in FIG. 1.

FIG. 2 illustrates an example dosing control system 200. The dosing control system 200 is implemented in an aftertreatment system, such as the aftertreatment system 100. The aftertreatment system is included in an internal combustion engine system. The aftertreatment system receives and treats exhaust gases produced by the internal combustion engine.

The dosing control system 200 includes a reductant injector 202 (e.g., doser, etc.), such as the dosing module 114. The reductant injector 202 is configured to selectively dose reductant into an exhaust conduit 204, such as the decomposition chamber 108, of the aftertreatment system. In various embodiments, the reductant injector 202 is mounted on (e.g., coupled to, attached to, etc.) the exhaust conduit 204. For example, the reductant injector 202 may extend through an aperture in the exhaust conduit 204 and be fastened to the exhaust conduit 204 about the aperture. The exhaust conduit 204 is configured to receive exhaust gases from the internal combustion engine (e.g., from an exhaust manifold, from a DPF, from an upstream component of the aftertreatment system, etc.) and provide treated exhaust gases to a downstream component of the aftertreatment system (e.g., SRC catalyst, muffler, tailpipe, etc.).

The reductant injector 202 is provided reductant from a reductant pump 206, such as the reductant pump 120, via a transfer conduit 208. The transfer conduit 208 may extend from an engine bay of a vehicle rearward and underneath the vehicle. While not shown in FIG. 2, it is understood that the reductant injector 202 may similarly be provided with air by an air pump, such as the air pump 130. In such applications, the reductant injector 202 is configured to mix the air and the reductant into an air-reductant mixture and to provide the air-reductant mixture into the exhaust conduit 204.

The reductant pump 206 is configured to draw reductant from a tank header 210 (e.g., fitting, etc.) via a supply conduit 212. In some embodiments, the reductant pump 206 is mounted directly on the tank header 210 such that the supply conduit 212 is eliminated. The tank header 210 receives reductant from a shut-off valve 214 (e.g., emergency valve, stop valve, ball valve, solenoid valve, etc.) which further receives the reductant from a reductant tank 216, such as the reductant source 118. The shut-off valve 214 is configured to be controlled by a dosing control system controller 218 to selectively prevent reductant from flowing from the reductant tank 216 to the tank header 210, thereby preventing reductant from flowing to the reductant pump 206 and the reductant injector 202. The shut-off valve 214 is closed when no power is being applied to open the shut-off valve 214. When the shut-off valve 214 is powered and the power to the shut-off valve 214 is subsequently removed, the shut-off valve 214 quickly closes to prevent the leakage of reductant therethrough.

The reductant tank 216 is configured to store reductant therein. The reductant tank 216 includes a vent 220 (e.g., purge valve, pressure release valve, etc.) configured to selectively open to vent air and/or reductant from the reductant tank 216 (e.g., to minimize an accumulation of pressure within the reductant tank 216, etc.).

The dosing control system 200 also includes a recirculation conduit 222 configured to selectively provide reductant from the reductant injector 202 to the reductant tank 216. Specifically, the reductant injector 202 is configured to be controlled by the dosing control system controller 218 to selectively provide reductant into the recirculation conduit 222 (e.g., when less reductant is needed to dose the exhaust gases in the exhaust conduit 204, when the temperature of the reductant injector 202 exceeds a threshold, etc.). The reductant provided by the recirculation conduit 222 back into the reductant tank 216 is configured to be recirculated by the reductant pump 206 to the reductant injector 202. As will be explained in more detail herein, the dosing control system 200 utilizes the shut-off valve 214 and the reductant pump 206 to provide reductant to the reductant injector 202 after a hot shut down of the internal combustion engine associated with the dosing control system 200, so long as the internal combustion engine is not in an emergency shut down state, thereby cooling the reductant injector 202 after a hot shut down using recirculated reductant and maintaining desirability of the reductant injector 202.

In various embodiments, the transfer conduit 208, the supply conduit 212, and the recirculation conduit 222 are constructed from stainless steel. In other embodiments, the transfer conduit 208, the supply conduit 212, and the recirculation conduit 222 are constructed from ethylene propylene diene monomer (EPDM) rubber. In various embodiments, the transfer conduit 208, the supply conduit 212, and the recirculation conduit 222 are constructed from a material having a melting point above 925° C.

Unlike other dosing systems which utilize specialized pumps and conduits, the dosing control system 200 is able to utilize a commercially available off-the-shelf (COTS) reductant pump 206, transfer conduit 208, supply conduit 212, and recirculation conduit 222 because the shut-off valve 214 is electronically controllable by the dosing control system controller 218. In this way, the dosing control system 200 is capable of being produced at a lower cost than other dosing systems which utilize specialized pumps and conduits.

As previously mentioned, the dosing control system controller 218 is communicable with the reductant injector 202. The dosing control system controller 218 is also communicable with the reductant pump 206 and the shut-off valve 214. As will be explained in more detail herein, the dosing control system controller 218 is configured to selectively position the shut-off valve 214 to prevent the flow of the reductant from the reductant tank 216 (e.g., to the tank header 210, to the reductant pump 206, etc.).

The dosing control system controller 218 includes a processing circuit 224 which includes a processor 226 and a memory 228. The dosing control system controller 218, the processing circuit 224, and/or the processor 226 may include a microprocessor, an ASIC, a FPGA, etc., or combinations thereof. The memory 228 may include, but is not limited to, electronic, optical, magnetic, or any other storage or transmission device capable of providing a processor, ASIC, FPGA, etc. with program instructions. The memory 228 may also include a memory chip, EEPROM, EPROM, flash memory, or any other suitable memory from which the associated controller can read instructions. The instructions may include code from any suitable programming language.

Specifically, the memory 228 includes a reductant pump module 230, a reductant injector module 232, an emergency shut down module 234, an ignition switch module 236, and a shut-off valve module 238.

The reductant pump module 230 may be configured to receive data regarding parameters (e.g., rotational speed, torque, voltage, current, etc.) associated with the reductant pump 206 and to provide commands (e.g., a target output, a target rate of output, etc.) to the reductant pump 206 to control the reductant pump 206. Specifically, the reductant pump module 230 is configured to determine if the reductant pump 206 is in a reductant pump command state. In the reductant pump command state, output from the reductant pump 206 is being commanded (e.g., by the dosing control system controller 218, by an engine control unit (ECU) of the internal combustion engine associated with the dosing control system controller 218, with an engine control module (ECM) of the internal combustion engine associated with the dosing control system controller 218, etc.). In some instances, the reductant pump 206 may be in the reductant pump command state even though the reductant pump 206 is not providing reductant to the reductant injector 202 (e.g., if the reductant tank 216 is empty, if the shut-off valve 214 is preventing flow of the reductant to the reductant pump 206, if the reductant pump 206 is not operating desirably, etc.). As will be explained in more detail herein, the dosing control system 200 may be configured to open the shut-off valve 214, or to keep the shut-off valve 214 open, in response to the reductant pump 206 is in the reductant pump command state, unless the dosing control system 200 is in an emergency shut down state.

The reductant injector module 232 may be configured to receive data regarding parameters (e.g., injection frequency, injection amount, voltage, current, etc.) associated with the reductant injector 202 and to provide commands (e.g., a target injection frequency, a target injection amount, etc.) to the reductant injector 202 to control the reductant injector 202.

The emergency shut down module 234 may be configured to receive data from and to provide data to an emergency system (e.g., fire suppression system, etc.) to determine if the dosing control system 200 is in an emergency shut down state. For example, the dosing control system controller 218 may be communicable with an ECU or ECM which receives an emergency signal (e.g., created in response to detecting an emergency condition, generated by an operator of the internal combustion engine, etc.). The emergency shut down module 234 determines that the dosing control system 200 is in the emergency shut down state in response to detecting the emergency signal. The emergency signal may indicate, for example, that immediate shut down of the internal combustion engine associated with the dosing control system 200 is desired (e.g., in response to a user pulling an emergency stop lever, in response to a fire suppression system activating due to a fire occurring, etc.). As will be explained in more detail herein, the dosing control system 200 is configured to close the shut-off valve 214, or to keep the shut-off valve 214 closed, in response to the dosing control system 200 being in the emergency shut down state.

The ignition switch module 236 may be configured to receive data regarding an ignition state (e.g., on, off, etc.) of the internal combustion engine associated with the dosing control system 200. For example, the ignition switch module 236 may determine that the internal combustion engine associated with the dosing control system 200 is in the ignition state when a key (e.g., physical key, wireless key, push-bottom key, etc.) operable to turn on an internal combustion engine associated with the dosing control system 200 is in an on position, such that the internal combustion engine is operable. Similarly, the ignition switch module 236 may determine that the internal combustion engine associated with the dosing control system 200 is in not in the ignition state when a key is in an off position, such that the internal combustion engine is not operable. The ignition switch module 236 may facilitate communication between the dosing control system controller 218 and the ECU and/or ECM associated with the dosing control system 200.

The shut-off valve module 238 may be configured to receive data from the shut-off valve 214. For example, the shut-off valve module 238 is configured to determine if the shut-off valve 214 is open or closed.

Unlike other dosing systems, the dosing control system 200 is configured to keep the shut-off valve 214 open after the internal combustion engine associated with the dosing control system 200 is turned off (e.g., after the ignition switch module 236 detects that a key of the internal combustion engine has been set to an off position, etc.). As a result, the reductant pump 206 may continue to draw reductant from the reductant tank 216 and provide the reductant tank to the reductant injector 202 for cooling the reductant injector 202 and subsequent recirculation to the reductant tank 216 via the recirculation conduit 222. While the internal combustion engine is turned off, the reductant injector 202 may be configured to recirculate all reductant received from the transfer conduit 208 to the recirculation conduit 222. In this way, the reductant injector 202 may be cooled after a hot shut down event, such as may occur if the internal combustion engine is shut down due to an emergency (e.g., via the emergency shut down module 234, etc.) or a fire (e.g., via the emergency shut down module 234, etc.). Other dosing systems may be unable to adequately cool an injector after a hot shut down event, thereby making such an injector undesirable thereafter.

In various embodiments, the dosing control system controller 218 is implemented in (e.g., physically located with, attached to, integrated within, etc.) a relay of the reductant pump 206. In other embodiments, the dosing control system controller 218 is implemented in a main control panel (e.g., ship panel, etc.) of an internal combustion engine associated with the dosing control system 200. In still other embodiments, the dosing control system controller 218 is implemented in the shut-off valve 214.

Figure 3:
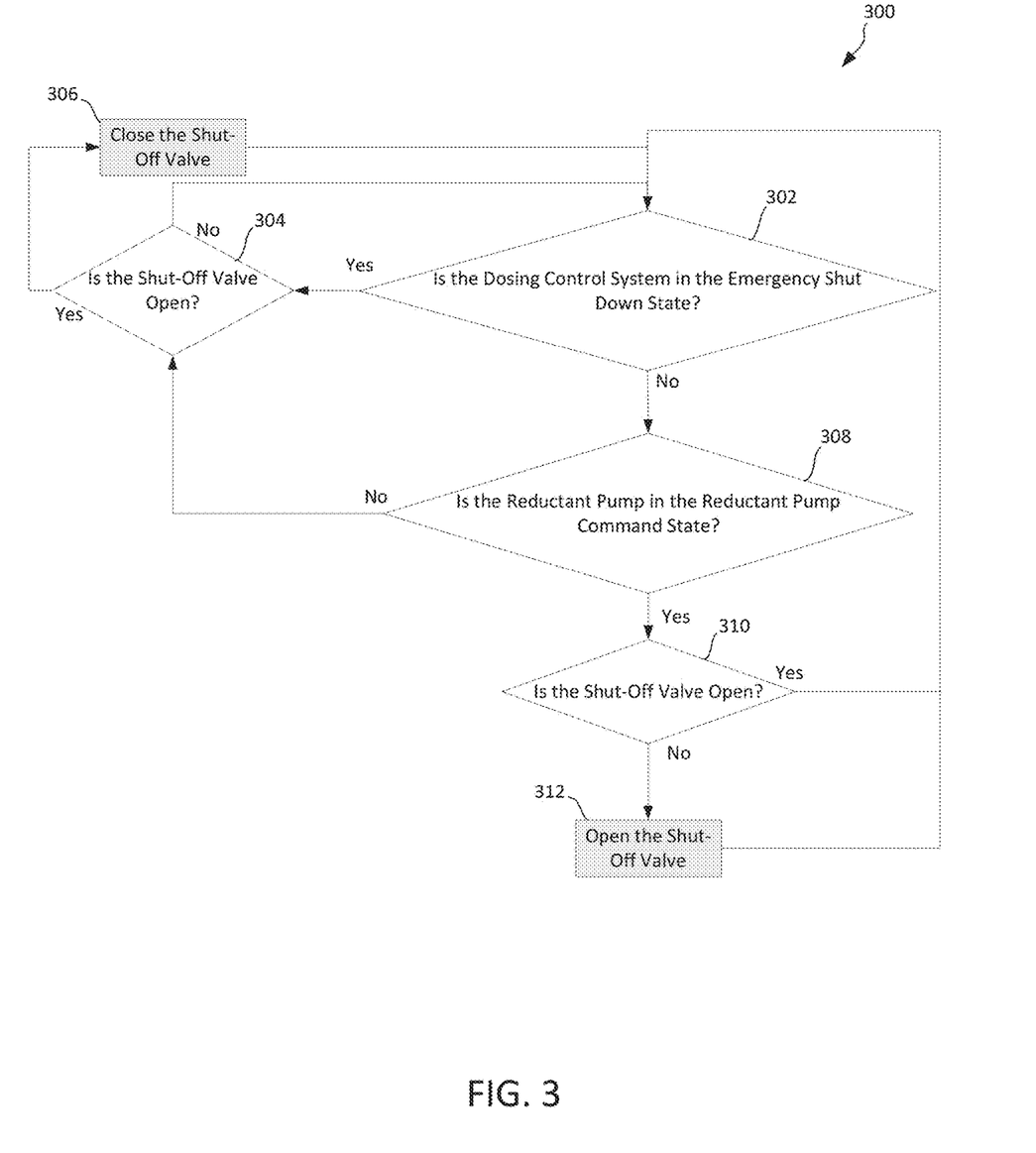
FIG. 3 is a detailed view of a control strategy for a dosing control system, such as the example dosing control system shown in FIG. 2.

FIG. 3 illustrates a control strategy 300 for the dosing control system 200. The control strategy 300 includes, in block 302, determining, by the dosing control system controller 218, if the dosing control system 200 is in the emergency shut down state. For example, the emergency shut down module 234 may be configured to determine that the dosing control system 200 is in the emergency shut down state in response to determining that an operator has pressed an emergency shut down button.

If the dosing control system 200 is in the emergency shut down state, then the control strategy 300 continues with, in block 304, determining if the shut-off valve 214 is open. For example, the shut-off valve module 238 may be configured to determine that the shut-off valve 214 is open based upon a position sensor within the shut-off valve 214, based upon a flow rate sensor within the shut-off valve 214, based upon a pressure within the shut-off valve 214, or based upon a last known position (e.g., open, closed, etc.) of the shut-off valve 214.

If the shut-off valve 214 is not open (e.g., the shut-off valve 214 is closed, etc.), the control strategy 300 begins with block 302 again. Otherwise, if the shut-off valve 214 is open, the control strategy 300 continues, in block 306, with closing the shut-off valve 214. For example, if the shut-off valve module 238 determines that the shut-off valve 214 is open and the dosing control system 200 is in the emergency shut down state, the shut-off valve module 238 will close the shut-off valve 214, thereby preventing flow of reductant from the reductant tank 216. The control strategy 300 then begins with block 302 again.

If the dosing control system 200 is not in the emergency shut down state, then the control strategy 300 continues with, in block 308, determining if the reductant pump 206 is in the reductant pump command state. For example, the reductant pump module 230 will determine if the reductant pump 206 is being commanded to provide reductant to the reductant injector 202.

If the reductant pump module 230 determines that the reductant pump 206 is in the reductant pump command state, then the control strategy 300 continues with, in block 310, determining if the shut-off valve 214 is open. If the shut-off valve 214 is open, the control strategy 300 begins with block 302 again. Otherwise, if the shut-off valve 214 is not open, the control strategy 300 continues, in block 312, with opening the shut-off valve 214. For example, if the shut-off valve module 238 determines that the shut-off valve 214 is closed, the dosing control system 200 is not in the emergency shut down state, and the reductant pump 206 is in the reductant pump command state, the shut-off valve module 238 will open the shut-off valve 214, thereby enabling flow of reductant from the reductant tank 216. The control strategy 300 then begins with block 302 again.

If the reductant pump module 230 determines that the reductant pump 206 is not in the reductant pump command state, then the control strategy 300 continues with block 304 as previously described. By utilizing the reductant pump command state in determining whether or not to open the shut-off valve 214, the control strategy 300 protects the reductant injector 202 in the event of a hot shut down of the internal combustion engine associated with the dosing control system 200 by ensuring that reductant is recirculated through the reductant injector 202, thereby cooling the reductant injector 202 after a hot shut down using recirculated reductant and maintaining desirability of the reductant injector 202. The control strategy 300 may be implemented to recirculate reductant to the reductant injector 202 for a target amount of time (e.g., two minutes, thirty seconds, etc.) or until the reductant injector 202 attains a target temperature (e.g., as determined by the reductant injector module 232, etc.).

Using the control strategy 300, the shut-off valve 214 is closed or maintained closed whenever the dosing control system 200 is in the emergency shut down state. While the control strategy 300 may consider the ignition state of the internal combustion engine associated with the dosing control system 200, the ignition state is not determinative of the operation of the control strategy 300.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to," "fluidly configured to communicate with," and the like, as used herein, mean the two components or objects have a pathway formed between the two components or objects in which a fluid, such as air, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the systems shown in the various example implementations are illustrative only and are not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. A dosing control system comprising:
   a shut-off valve configured to receive reductant from a reductant tank;
   a reductant pump configured to selectively receive the reductant from the shut-off valve, the reductant pump configured to selectively be operated in a reductant pump command state;
   a reductant injector configured to receive the reductant from the reductant pump;
   a recirculation conduit coupled to the reductant injector and the reductant tank, the recirculation conduit configured to selectively provide the reductant from the reductant injector to the reductant tank; and
   a dosing control system controller configured to:
   open the shut-off valve to enable a flow of the reductant to the reductant pump when the reductant pump is operated in the reductant pump command state;
   determine if the reductant pump is operated in the reductant pump command state; and
   close the shut-off valve in response to determining that the reductant pump is not operated in the reductant pump command state;
   wherein the shut-off valve is capable of preventing the flow of the reductant to the reductant pump when the reductant pump is operated in the reductant pump command state and when the reductant pump is not operated in the reductant pump command state.

2. The dosing control system of claim 1, wherein:
   the reductant pump is configured to provide the reductant to the reductant injector when the reductant pump is operated in the reductant pump command state;
   the dosing control system controller comprises an ignition switch module that is configured to detect when an internal combustion engine associated with the dosing control system is turned off; and
   the dosing control system controller is configured to command the reductant pump to be in the reductant pump command state while the ignition switch module detects that the internal combustion engine associated with the dosing control system is turned off.

3. The dosing control system of claim 1, wherein the dosing control system controller is configured such that, when the reductant pump is operated in the reductant pump command state, the shut off valve is open, and the dosing control system is operated in an emergency shut down state, the dosing control system closes the shut off valve so that the shut off valve prevents the flow of the reductant to the reductant pump.

4. The dosing control system of claim 1, wherein the dosing control system controller is further configured to determine a temperature of the reductant injector, to compare the temperature of the reductant injector to a target temperature, and to open the shut-off valve to enable the flow of the reductant to the reductant pump when the reductant pump is operated in the reductant pump command state and the temperature of the reductant injector exceeds the target temperature.

5. The dosing control system of claim 1, wherein:
   the dosing control system controller comprises an ignition switch module that is configured to detect when an internal combustion engine associated with the dosing control system is turned off; and
   the dosing control system controller is configured to selectively open the shut-off valve while the ignition switch module detects that the internal combustion engine associated with the dosing control system is turned off.

6. The dosing control system of claim 1, further comprising:
   a supply conduit coupled to the shut-off valve and the reductant pump, the supply conduit configured to selectively provide the reductant from the shut-off valve to the reductant pump;
   wherein the reductant pump and the shut-off valve are separately located.

7. The dosing control system of claim 6, further comprising:
   a transfer conduit coupled to the reductant pump and the reductant injector, the transfer conduit configured to selectively provide the reductant from the reductant pump to the reductant injector;
   wherein the reductant pump and the reductant injector are separately located.

8. A method for controlling a shut-off valve and a reductant pump of a dosing control system including a dosing control system controller and a reductant injector that receives reductant from the reductant pump when the reductant pump is operated operating in a reductant pump command state, the method comprising:
   determining, by the dosing control system controller, if the dosing control system is operated in an emergency shut down state;
   determining, by the dosing control system controller, if the reductant pump is operated in the reductant pump command state;
   detecting, by the dosing control system controller, when an internal combustion engine associated with the dosing control system is turned off;
   commanding, by the dosing control system controller, the reductant pump to be in the reductant pump command state when the dosing control system controller detects that the internal combustion engine associated with the dosing control system is turned off;
   opening, by the dosing control system controller, the shut-off valve in response to determining that the dosing control system is not in the emergency shut down state and that the reductant pump is operated in the reductant pump command state; and closing, by the dosing control system controller, the shut-off valve in response to determining that the reductant pump is not in the reductant pump command state.

9. The method of claim 8, further comprising determining, by the dosing control system controller, that the shut-off valve is open or that the shut-off valve is closed.

10. The method of claim 9, wherein:
the dosing control system controller is configured to open the shut-off valve only after determining that the shut-off valve is closed; and
the dosing control system controller is configured to close the shut-off valve only after determining that the shut-off valve is open.

11. The method of claim 8, wherein the dosing control system controller is configured to determine if the reductant pump is operated in the reductant pump command state only after determining that the dosing control system is operated in the emergency shut down state.

12. A dosing control system controller comprising:
a processing circuit selectively operable in an emergency shut down state and a reductant pump command state, the processing circuit configured to:
shut down a reductant pump in the emergency shut down state;
power the reductant pump in the reductant pump command state to cause reductant to be provided to a reductant injector;
open a shut-off valve in the reductant pump command state and not in the emergency shut down state;
detect that an internal combustion engine associated with the reductant pump is turned off;
command the reductant pump to be in the reductant pump command state while detecting that the internal combustion engine associated with the reductant pump is turned off;
determine that the shut-off valve is open or closed;
open the shut-off valve only after determining that the shut-off valve is closed; and
close the shut-off valve only after determining that the shut-off valve is open.

13. The dosing control system controller of claim 12, wherein the processing circuit is further configured to close the shut-off valve when not in the reductant pump command state.

14. The dosing control system controller of claim 12, wherein the processing circuit is further configured to close the shut-off valve in the emergency shut down state.

15. The dosing control system controller of claim 12, wherein the processing circuit is further configured to:
determine a temperature of the reductant injector;
compare the temperature to a target temperature; and
open the shut-off valve in the reductant pump command state and when the temperature exceeds the target temperature.

16. The dosing control system controller of claim 12, wherein the processing circuit is further configured to open the shut-off valve while detecting that the internal combustion engine is turned off.

17. The dosing control system controller of claim 12, wherein the processing circuit is further configured to:
close the shut-off valve when not in the reductant pump command state;
close the shut-off valve in the emergency shut down state;
determine a temperature of the reductant injector;
compare the temperature to a target temperature;
open the shut-off valve in the reductant pump command state and when the temperature exceeds the target temperature; and
open the shut-off valve while the internal combustion engine is turned off.

18. A method for controlling a shut-off valve and a reductant pump of a dosing control system including a dosing control system controller and a reductant injector that receives reductant from the reductant pump when the reductant pump is operated in a reductant pump command state, the method comprising:
determining, by the dosing control system controller, if the dosing control system is operated in an emergency shut down state;
determining, by the dosing control system controller, if the reductant pump is operated in the reductant pump command state after determining that the dosing control system is operated in the emergency shut down state;
detecting, by the dosing control system controller, when an internal combustion engine associated with the dosing control system is turned off;
commanding, by the dosing control system controller, the reductant pump to be in the reductant pump command state when the dosing control system controller detects that the internal combustion engine associated with the dosing control system is turned off; and
opening, by the dosing control system controller, the shut-off valve in response to determining that the dosing control system is not in the emergency shut down state and that the reductant pump is operated in the reductant pump command state.

* * * * *